UNITED STATES PATENT OFFICE.

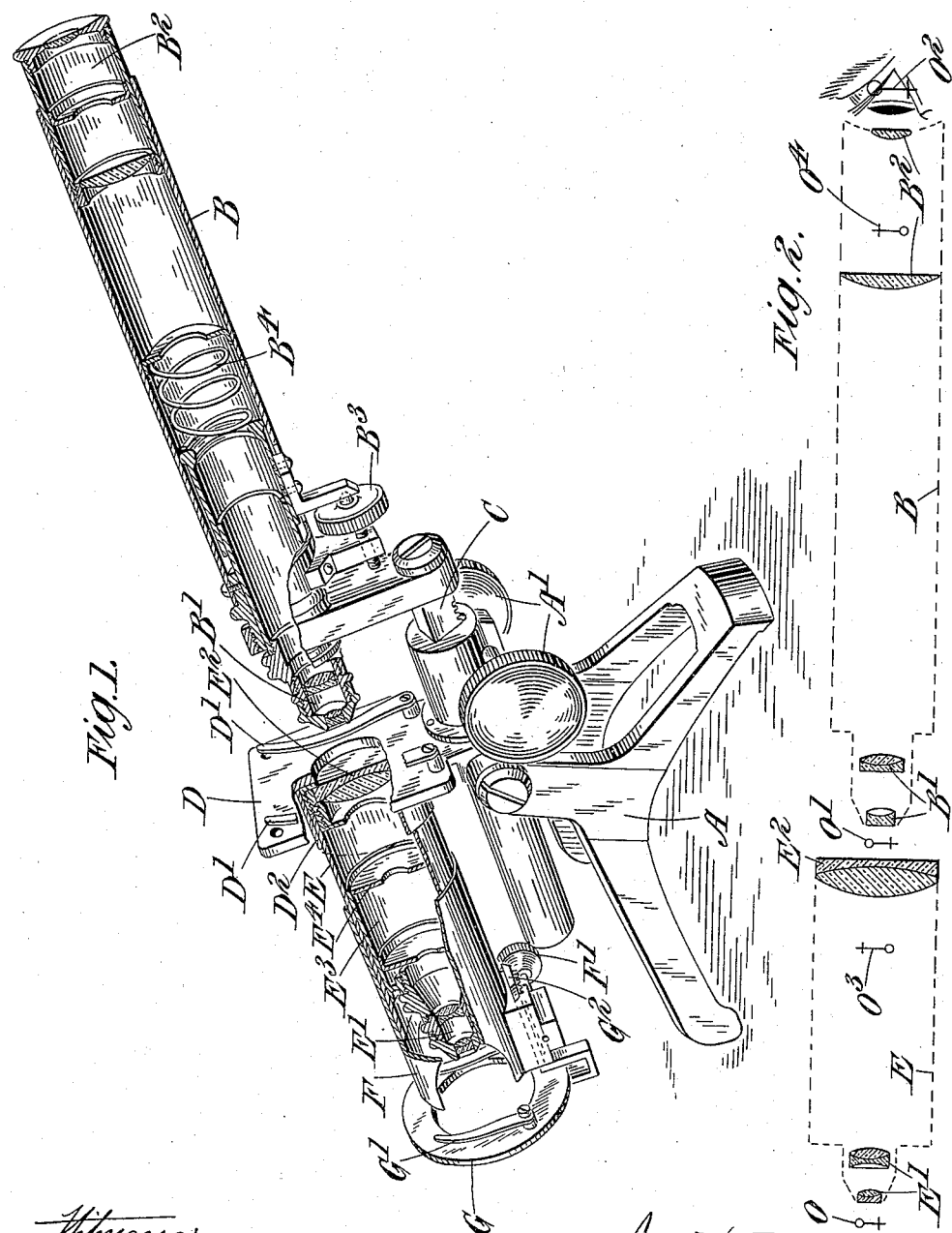

ALFRED CORNELL, OF TONBRIDGE, AND FREDERICK NATHANIEL DAVIDSON, OF LONDON, ENGLAND; SAID CORNELL ASSIGNOR TO SAID DAVIDSON.

MICROSCOPE APPARATUS.

1,161,848.   Specification of Letters Patent.   Patented Nov. 30, 1915.

Application filed March 22, 1915.   Serial No. 16,100.

*To all whom it may concern:*

Be it known that we, ALFRED CORNELL, a subject of the King of England, residing at Tonbridge, county of Kent, England, and FREDERICK NATHANIEL DAVIDSON, a subject of the King of England, residing in London, England, have invented certain new and useful Improvements in Microscope Apparatus, of which the following is a specification.

This invention is for improvements in or relating to microscope apparatus, and has for one of its objects to provide an improved and cheap form of apparatus of great magnifying power, which may be used both for observations and photography.

The primary feature of the invention consists in the combination of two compound microscopes, one, the primary, to produce an image in air of the object inspected, and the other, the secondary, to magnify that image. Conveniently, this combination takes the form in which the aforesaid secondary has a microscope stage, and the said primary is adjustably mounted at or on the under side of that stage. Conveniently also the primary microscope is provided with a stage to receive the object to be inspected.

For a more complete understanding of the invention reference is directed to the accompanying drawings wherein there is illustrated, by way of example only, one constructional form of microscope apparatus according to the invention.

In these drawings:—Figure 1 is a perspective view of the apparatus, certain parts being broken away, and other parts shown in section; and Fig. 2 is a diagrammatic view of one arrangement of lenses.

Like letters of reference refer to like parts throughout the drawings.

The apparatus illustrated comprises a stand A supporting a microscope tube B having an objective $B^1$ and an eye-piece $B^2$ of any suitable nature. This tube B is carried by a rack C adjustable in the stand A by the finger nuts $A^1$, and the objective $B^1$ is adjustable in relation to the eye-piece $B^2$ by a finger nut $B^3$ operating in conjunction with the spring $B^4$; this arrangement is well known as the fine adjustment. The stand A also carries a stage D having clips $D^1$ to hold in place a slide or other object to be viewed. As thus far described the apparatus is an ordinary microscope. Below the stage D however there is mounted another microscope tube E having an objective $E^1$ and an eye-piece $E^2$, which latter in the construction shown takes the form of a plano-convex lens. A meniscus lens or a combination of lenses might be substituted for this plano-convex lens if desired. The objective $E^1$ of course projects an image in air, i. e. inside the tube E, and the eye-piece $E^2$ magnifies that image and projects it as a second image in air as will be hereinafter described with reference more particularly to Fig. 2 of the drawings.

The tube E is mounted on the under-side of the stage D in an underfitting $D^2$ projecting from the stage, and conveniently the tube E is simply held frictionally in the fitting $D^2$. The objective $E^1$ is shown as carried by a tube $E^3$ which slides in the tube E and is held frictionally in position therein, for the purpose of altering the relationship between the objective $E^1$ and the eye-piece $E^3$ when necessary. The tubes E and $E^3$ are provided with internal stop diaphragms $E^4$. It may be advisable in some cases to provide the tube E with the stops and objective in fixed positions therein and so do away with tube $E^3$.

Carried by a tube F which slides on the outside of the tube E, and is held frictionally in place thereon, is a stage G having clips $G^1$ to hold in place a slide or other object to be viewed. Conveniently the stage G is adjustable in relation to the tube F by the rack $G^2$ and the finger nut $F^1$.

Referring to Fig. 2 which diagrammatically illustrates the arrangement of the lenses, it will be seen that the object C to be inspected, which may conveniently be mounted in the stage G, has an image of itself projected in air at $O^1$ by the objective $E^1$ and eye-piece $E^2$. This image $O^1$ is picked up by the secondary microscope objective $B^1$ and eye-piece $B^2$ to form an image $O^2$ upon the retina of the eye of a person looking into the microscope (see Fig. 2). Intermediate images $O^3$ and $O^4$ are also formed. It will be understood that the illustration of the images in Fig. 2 is purely diagrammatical and that no attempt has been made to represent the various magnifications that occur.

If the eye-piece $B^2$ and its tube B of the secondary microscope be removed, and a camera put in its place the screen or plate thereof would receive an image, and in this manner the apparatus may be adapted for photography.

From the above description it will be seen that the apparatus comprises two compound microscopes, one, the primary, (i. e. in the microscope tube E), producing an image in air (i. e. O¹, Fig. 2) of the object inspected, and the other microscope, the secondary, (i. e. in the microscope tube B,) magnifying that image.

The aforesaid primary compound microscope, i. e. the tube E with its accompanying fittings, may be made as a separate article and sold for attachment to ordinary microscopes, or it may be embodied as one part of a complete apparatus comprising two microscopes.

It will be seen that the general arrangement adopted is somewhat similar to that shown and described in the specification of the prior United States Patent No. 1,128,761 of Alfred Cornell, who is one of the present applicants. Moreover, the primary microscope is fitted with stops as shown in the telescope-objective tube of the said prior specification. A difference between the present invention and this prior arrangement is that a microscope and its accompanying fittings are substituted for the tube containing a telescope-objective described in the said prior specification.

The stage G of the primary microscope E is shown as being readily removable. If it be taken away and the objective E¹ be removed from the tube E, and next the lens E² forming the eye-piece of the microscope E be reversed in and with the tube E, so that the convex surface still points toward the object to be observed, the instrument will have become converted into the combination of microscope and telescope shown and described in the aforesaid prior United States Patent No. 1,128,761. It is one of the features of the present invention, so to arrange the tube E and its fittings that the conversion just described may readily be effected. It is, of course, not essential to reverse the lens E² in its mount, so long as the mount itself, i. e. the tube E, be reversed, but by arranging the convex surface of the lens to face toward the object to be viewed, better results will be obtained.

The invention is, of course, not limited to the precise details of construction hereinbefore specified, since these may be modified in certain respects without departing from the spirit and scope of the invention.

What we claim as our invention and desire to secure by Letters Patent is:—

1. The combination of two compound microscopes one, the primary, to produce an image in air of the object inspected, and the other, the secondary, to magnify that image.

2. The combination of two compound microscopes, one, the primary, to produce an image in air of the object inspected, and the other, the secondary, to magnify that image; and a stage intermediate the two microscopes.

3. The combination of two compound microscopes, one, the primary, to produce an image in air of the object inspected, and the other, the secondary, to magnify that image; a stage intermediate the two microscopes, and means on the underside of the stage to carry the primary microscope.

4. The combination of two compound microscopes, one, the primary, to produce an image in air of the object inspected, and the other, the secondary, to magnify that image; a stage intermediate the two microscopes, and means to adjustably mount the primary microscope on the underside of the stage.

5. The combination of two compound microscopes, one, the primary, to produce an image in air of the object inspected, and the other, the secondary, to magnify that image; a stage intermediate the two microscopes, and a second stage adjacent the end of the primary to receive the object.

6. The combination of two compound microscopes, one (a), the primary microscope provided with an objective lens to project an image in air of the object inspected, and a plano-convex lens to magnify said image and project a second image in air, and the other (b), the secondary microscope, to magnify the last named image.

7. The combination of two compound microscopes, one (a), the primary microscope provided with an objective lens to project an image in air of the object inspected, and a meniscus lens to magnify said image and project a second image in air, and the other (b), the secondary microscope, to magnify the last named image.

8. The combination of two compound microscopes, one (a) the primary microscope to produce an image in air of the object inspected and comprising a tube provided at one end with a removable objective lens and at the other end with a positive lens, and the other (b), the secondary microscope to magnify the image projected by said positive lens; a stage intermediate the two microscopes, and a carrier on the underside of said stage and adapted to engage either end of the primary microscope tube, for the purpose set forth.

In testimony whereof we have signed our names to this specification in the presence of two subscribing witnesses.

ALFRED CORNELL.
FREDERICK NATHANIEL DAVIDSON.

Witnesses:
ERNEST W. MOSS,
RONALD S. DOLLEYMORE.